United States Patent [19]
Blumör et al.

[11] Patent Number: 5,757,147
[45] Date of Patent: May 26, 1998

[54] METHOD AND APPARATUS FOR CONTROLLING MULTIPLE MOTOR DRIVE OF PRINTING MACHINE

[75] Inventors: Joachim Blumör, Halnburg; Albrecht Völz, Rödermark; Holger Wiese, Obertshausen, all of Germany

[73] Assignee: Man Roland Druckmaschinen AG, Offenbach am Main, Germany

[21] Appl. No.: 659,944

[22] Filed: Jun. 7, 1996

[30] Foreign Application Priority Data

Jun. 9, 1995 [DE] Germany .................. 195 20 642.8

[51] Int. Cl.$^6$ .................................................. H02P 1/54
[52] U.S. Cl. ........................... 318/41; 318/68; 318/85; 318/90; 318/112; 399/18; 271/256
[58] Field of Search .................... 318/34–112; 399/9, 399/18; 271/256, 3.14, 8.1, 278

[56] References Cited

U.S. PATENT DOCUMENTS

| 3,838,321 | 9/1974 | Damm et al. | 318/66 |
|---|---|---|---|
| 4,271,379 | 6/1981 | Eckelmeyer | 318/77 |
| 4,617,497 | 10/1986 | Wolf | 318/77 |
| 4,767,970 | 8/1988 | Rodal | 318/375 |
| 4,775,087 | 10/1988 | Moser et al. | 226/143 |
| 5,113,123 | 5/1992 | Noser et al. | 318/106 |
| 5,196,769 | 3/1993 | Chiba et al. | 318/39 |
| 5,239,247 | 8/1993 | Habig et al. | 318/77 |
| 5,678,138 | 10/1997 | Kobayashi et al. | 399/18 |

FOREIGN PATENT DOCUMENTS

| 23 41 510 | 4/1974 | Germany . |
|---|---|---|
| 36 14 979 A1 | 11/1987 | Germany . |
| 41 37 979 A1 | 5/1993 | Germany . |
| 42 02 722 A1 | 8/1993 | Germany . |
| 43 22 744 A1 | 1/1995 | Germany . |

*Primary Examiner*—David S. Martin
*Attorney, Agent, or Firm*—Graham & James LLP

[57] ABSTRACT

A method and apparatus for controlling a multiple motor drive arranged to drive printing cylinders of a printing machine sychronously decelerates each of the drives upon a failure or defect occurring in one or more of the components of the drive system such that the individual printing cylinders are decelerated in a manner synchronized with one another with respect to rotation angle. The apparatus includes a main control device which detects a failure in one of the drive system components and controls the drive units to decelerate the drive units to a standstill in accordance with a time function. The time function is determined by the rotation of the drive unit which contains the component that failed. The apparatus ensures in an electrical and single-fault manner that the failure of a component in one of the drive units does not lead to rotation of the cylinders or axles beyond a predetermined amount which would cause damage to the grippers or the cylinders by the grippers contacting the cylinder surface of an adjacent cylinder.

17 Claims, 1 Drawing Sheet

METHOD AND APPARATUS FOR CONTROLLING MULTIPLE MOTOR DRIVE OF PRINTING MACHINE

BACKGROUND OF THE INVENTION

I. Field of the Invention

This invention relates to a method and apparatus for controlling a multiple motor drive of a printing machine, and more particularly, to a method and apparatus for controlling a plurality of printing cylinder drives in a multiple motor drive system of a printing machine for sychronously decelerating the drives and printing cylinders upon a failure or defect occurring in one or more components of the multiple motor drive system to maintain the synchronous relationship of the printing cylinders and to avoid damage to the printing cylinders and associated grippers.

II. Description of Related Art

It is known to drive cylinders of sheet-fed offset printing machines using a DC motor via a continuous gear train. Because of the individual channels rolling between the plate cylinder and the blanket cylinder and between the blanket cylinder and the counterpressure cylinder, torsional oscillations are generated in the elastically deformable gear train, which leads to printing difficulties. It is also known, in addition to the continuous drive train, to provide a longitudinal shaft and to distribute the power flowing from the longitudinal shaft to the gear wheel train via one or more gear mechanisms. Although this arrangement results in a stiffening of the gear mechanism system, this arrangement also requires a large number of mechanical components and a relatively complicated construction. Solutions have also been disclosed in which a plurality of electrically controlled drives distribute power into a continuous gear wheel train. These solutions are expensive and difficult to assemble because they require a large number of mechanical components and a complicated construction of the continuous gear wheel train. In addition, these solutions are only partially able to damp the torsional vibrations in the gear train.

DE 43 22 744 A1 discloses an electrical drive system for a printing machine, in which a motor is provided for each printing cylinder for driving the respective printing cylinder. A control means is provided to control the motors so as to drive each cylinder in a synchronous manner with respect to a rotational position of the other cylinders. For this purpose, angular position transmitters are directly arranged on each of the cylinders. The signals from the angular position transmitters are evaluated by a common control means for controlling the rotation of the individual cylinders in a manner synchronized relative to one another with respect to the rotation angle. However, it is precisely in the case of sheet-processing machines, in particular sheet-fed offset printing machines, that it is necessary to ensure that the cylinders are not rotated relative to one another beyond a certain amount because in a sheet-fed printing machine, the grippers or gripper fingers of the counterpressure cylinder and of the transfer drums extend outside of an outer circumferential surface of the counterpressure cylinder and transfer drums. For example, a rotation of the counterpressure cylinder relative to the blanket cylinder beyond a specific amount would result in damage to the grippers and to the cylinder surface caused by the cylinder surface coming into contact with the grippers. The device described in DE 43 22 744 A1 does not include a means for preventing the cylinders from being rotated relative to one another beyond a certain amount to avoid damage to the grippers and to the surfaces of the cylinders and does not include a means for synchronously decelerating the printing cylinders in response to a component in the printing cylinder drive system experiencing a failure or defect.

DE 42 02 722 A1 discloses a safety device for closed-loop or open-loop control of drive units of a printing machine, in which printing machine the cylinders have individual drives. In order to solve the above-described problems with sheet-processing printing machines, a mechanical coupling is provided at each location between the cylinders each having an individual drive, the coupling being designed in such a way that the cylinders may not be rotated relative to one another beyond a predetermined amount. To achieve control of rotation of the cylinders without disrupting the rotational synchronous positioning, the corresponding coupling parts do not contact each other when the relative rotation of the cylinders progresses beyond a predetermined amount, which as mentioned above, leads to destruction of the grippers and the surfaces of the cylinders. However, no description is given in DE 42 02 722 A1 of an electrical rotational safety system for solving the problems described above.

DE 41 37 979 A1 discloses a drive system for a printing machine having a plurality of printing units, in which the individual printing units or groups of printing units are decoupled mechanically from one another and each of these groups has a dedicated drive motor. A device for controlling angular rotation is provided for predetermining a permissible rotation angle deviation of the individual printing units of the printing unit groups in such a way that the deviation is kept to a minimum for the rotation angle position which corresponds to a sheet transfer operation. The register quality is intended to be improved using this drive system.

BRIEF DESCRIPTION OF THE PRESENT INVENTION

The preferred embodiments of the present invention provide a method and apparatus for controlling a multiple motor drive system of a printing machine, which includes a plurality of drives for driving printing cylinders, to sychronously decelerate the drives upon a failure or defect occurring in one or more of the components of the drive system such that the rotational positional relationship of each of the cylinders is maintained relative to each other and damage to the cylinders and associated grippers is prevented.

According to the preferred embodiments of the present invention, in the event of a failure of a component of a multiple motor drive system, for example, of a position transmitter, a signal transmitter provided for the commutation or detection of an amount of voltage supplied to the drive motors to determine the rate of rotation of each of the drive motors, of a rectifier or some other component, all the drives are slowed down to a standstill in accordance with a single time function. The deceleration of each of the drives is carried out in accordance with the same time ramp or time function which is determined by the particular drive experiencing the failure or having the defective component. For example, if a high-resolution rotational position transmitter in a drive unit fails, this particular drive unit is slowed down on the basis of the still present signal supplied by a signal transmitter provided for the commutation of the drive motor, which signal is used to define the time function for declerating the defective drive unit. The remaining drive units which have not experienced a failure or defective component are also slowed down to a standstill according to this same time function determined by the signal transmitter of the defective drive unit.

Other features and advantages of the present invention will become apparent from the following description of the preferred embodiments of the invention which are shown in the accompanying drawings.

DETAILED DESCRIPTION OF PREFERRED EMBODIMENTS

Figure 1:
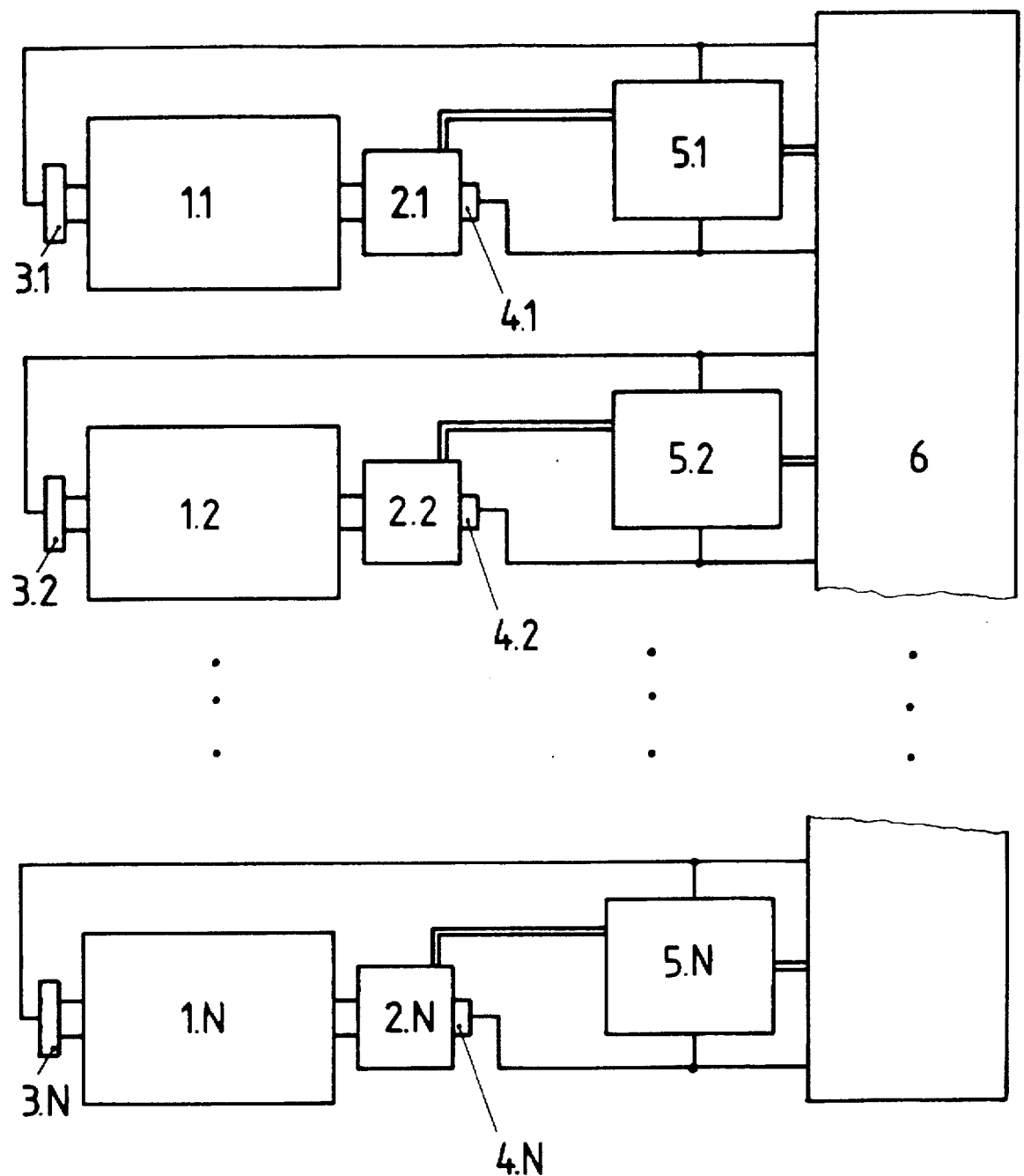
FIG. 1 is a schematic view of a drive control system according to a preferred embodiment of the present invention.

An apparatus for controlling a multiple motor drive of a printing machine according to a preferred embodiment of the present invention is shown in FIG. 1. In the apparatus of FIG. 1, individual drives provided for each cylinder, generally designated as an axle, of a printing machine are shown.

However, the preferred embodiments of the present invention are not limited to controlling individual cylinders or axles of a printing machine in synchronism in a single-fault safe manner. Individual cylinder groups can also have a dedicated drive in each case and can be mechanically decoupled from one another. For example, an embodiment may include a plurality of individual, mechanically decoupled printing units wherein each printing unit comprises a counterpressure cylinder, a blanket cylinder, a plate cylinder and a transfer drum. Each printing unit according to this embodiment preferably includes a single drive motor connected via a gear wheel train to drive the counterpressure cylinder, the blanket cylinder, the plate cylinder and the transfer drum of one respective printing unit. Each drive motor for each printing unit is controlled by a superordinated main control device, in accordance with the preferred embodiments of the present invention described in more detail below. The drive motors may comprise a DC motor, an asynchronous motor having upstream, high dynamic drive control means and rotational movement detection via a computed motor model or some other suitable motor and control means.

In FIG. 1, a plurality of individual, mechanically mutually decoupled cylinders 1.1 to 1.N are provided with a respective one of a plurality of drive motors 2.1 to 2.N. Each of the drive motors 2.1 to 2.N preferably comprises a DC motor, and more specifically, a brushless DC motor. On the side of the apparatus shown in FIG. 1 facing away from the motors 2.1 to 2.N, that is, the side representing the load side of the cylinders 1.1 to 1.N, there are provided a plurality of high resolution position transmitters 3.1 to 3.N. Each of the cylinders 1.1 to 1.N is preferably provided with a single one of the high resolution position transmitters 3.1 to 3.N. Each of the high resolution position transmitters 3.1 to 3.N preferably comprises an incremental transmitter.

Each of a plurality of signal transmitters 4.1 to 4.N is preferably directly connected to a respective one of the motors 2.1 to 2.N. The signal transmitters 4.1 to 4.N may be designed to have a resolution which is not as high as the position transmitters 3.1 to 3.N.

Signal information for the commutation of the motors 2.1 to 2.N is obtained from the signal transmitters 4.1 to 4.N to determine the amount of voltage supplied to the motors 2.1 to 2.N and thereby, to determine the rate of rotation of each of the drive motors 2.1 to 2.N.

A plurality of drive control devices 5.1 to 5.N are also provided. The drive control devices 5.1 to 5.N each preferably comprise a microprocessor, computer or other suitable control device. Each of the drive control devices 5.1 to 5.N is connected to one of the motors 2.1 to 2.N, one of the position transmitters 3.1 to 3.N and one of the signal transmitters 4.1 to 4.N, respectively. Signals from the position transmitters 3.1 to 3.N and from the signal transmitters 4.1 to 4.N are transmitted to a respective one of the drive control devices 5.1 to 5.N. The drive control devices 5.1 to 5.N apply current to a respective one of the individual motors 2.1 to 2.N via integrated rectifiers, which are not shown. The individual drive control devices 5.1 to 5.N of the drive units in this arrangement control the axles of the motors 2.1 to 2.N in such a way that the cylinders 2.1 to 2.N run in a manner synchronized with one another with respect to a rotation angle up to a predetermined tolerance to prevent damage to the cylinders 1.1 to 1.N and associated grippers.

The drive control devices 5.1 to 5.N and the signals from the position transmitters 3.1 to 3.N, as well as, the signal transmitters 4.1 to 4.N, are also transmitted to a main control device 6 which controls each of the individual drives. The main control device 6 preferably comprises a control computer or other suitable control device which is capable of performing the functions explained in more detail below. In this arrangement, the main control device 6 controls the positions of the axles of the individual motors 2.1 to 2.N, via the individual drive control devices 5.1 to 5.N, in such a way that the previously mentioned synchronicity with respect to the angular position of the cylinders is maintained despite the occurrence of a failure or defect in one or more of the components of the drive system. The closed-loop control of the rate of rotation of the individual motors 2.1 to 2.N is subordinated to the main control loop of the main control device 6. The main control device uses the rate of rotation information derived from the signals received from the signal transmitters 4.1 to 4.N to control the motors 2.1 to 2.N to rotate the cylinders 1.1 to 1.N always in angular synchronism with one another despite changes in rates of rotation of the cylinders.

Below there follows a description of various measures according to the preferred embodiments of the present invention, which are initiated if a component of a drive unit of the drive system fails. The measures, which are still to be described, are defined and executed in that, as already mentioned above, the superordinated main control device 6 reads signals from each of the individual drive control devices 5.1 to 5.N, the position transmitters 3.1 to 3.N and the signal transmitters 4.1 to 4.N and then checks each of the devices 3.1 to 3.N, 4.1 to 4.N and 5.1 to 5.N to determine the presence or absence of the signals and to determine if the devices are functioning properly, i.e., to determine if the signals supplied are within an accepted range of values.

The main control device 6 also continuously checks the serviceability of the individual drive control devices 5.1 to 5.N, in addition to the corresponding associated rectifiers. The main control device 6 also checks for a main power failure using a known power sensing device.

Failure of Drive Control Device/Rectifier

Let it be assumed that the drive control device 5.1 or the corresponding rectifier (not shown) experiences a failure. As soon as this failure is detected by the main control device 6, the transmitter signal of the high-resolution position transmitter 3.1 becomes the control variable for the further processing sequence. That is, the main control device 6 uses the signal from the high-resolution transmitter 3.1 to define a time function for decelerating each of the motors 2.2 to 2.N so that the cylinders 1.1 to 1.N remain in perfect rotational synchronicity relative to each other.

As a result of the failure of the drive control device 1.1 or of the corresponding rectifier, a defined electrical breaking of the cylinder 1.1 via the motor 2.1 is no longer possible. This failure is thus accompanied by the torque-free switching of the drive assigned to the cylinder 1.1 so that the drive and the cylinder 1.1 are allowed to decelerate in an uninhibited manner. The remaining motors 2.2 to 2.N are controlled by the main control device 6 so as to be slowed down via the associated drive control devices 5.2 to 5.N exactly in accordance with the time function which is defined by the position transmitter 3.1 of the defective drive unit. The cylinder 1.1 and the motor 2.1 coupled to the cylinder 1.1 are thus allowed to decelerate to a standstill. The remaining cylinders 1.2 to 1.N are also decelerated via the motors 2.2 to 2.N in a manner synchronized with respect to the rotation angle of the cylinder 1.1.

Failure of a Motor

In this example, let it be assumed that the motor 2.1 of the cylinder 1.1 fails. In this case, as in the example described above of the failure of a drive control device or a corresponding rectifier, the slowing down of the motors 2.2 to 2.N in a manner synchronized with respect to rotation angle is carried out via the drive control devices 5.2 to 5.N, the signals from the position transmitter 3.1 of the defective motor 2.1 being used as the control value by the main control device 6. Thus, there is carried out a deceleration of the motors 2.2 to 2.N with current being applied to the motors 2.2 to 2.N by the main control device 6 and the associated drive control devices 5.2 to 5.N in such a way that the rotational angle synchronism of each of the cylinders is maintained.

Failure of Position Transmitter

It is assumed that the position transmitter 3.1 of the cylinder 1.1 with the motor 2.1 suffers a failure. This failure is detected by the main control device 6 and then the main control device 6 uses the signal from the signal transmitter 4.1 for the commutation of the motor 2.1 as a control value for the controlled deceleration of the motor 2.1 and of the remaining motors 2.2 to 2.N. That is, the rate of rotation of the motor 2.1, which is determined from the signal generated by the signal transmitter 4.1 detecting the voltage applied to the motor 2.1, is used to control the deceleration of the non-defective motors 2.2 to 2.N. Although the signal transmitters 4.1 to 4.N may have a lower accuracy than the high-resolution position transmitters 3.1 to 3.N, decelerating the overall system without damage is still possible.

Failure of A Signal Transmitter Serving for Commutation

Here it is assumed that the signal transmitter 4.1 serving for commutation of the motor 2.1 fails. As a result of the failure of the signal transmitter 4.1, the motor 2.1 can no longer have current applied in a defined manner. This means that there is a fault which corresponds to torque-free switching so that the drive and cylinder 1.1 are allowed to decelerate in an uninhibited manner. As in the case of failure of a drive control device/rectifier or the failure of a motor, the signal values from the position transmitter 3.1 are used by the main control device 6 as a control value and the remaining motors 2.2 to 2.N of cylinders 1.2 to 1.N are slowed down to a standstill in a manner synchronized with respect to the rotation angle corresponding to the signals from the position transmitter 3.1.

In the case of a failure of this type, provision can be made, in a development according to the preferred embodiments of the present invention, for commutation signals to be derived from the position signals of the position transmitter 3.1 of the defective axle or cylinder. This can be carried out, for example, by having the main control device 6 count the signals of the position transmitter 3.1 as a function of time and compare the position signal per time values to known values which convert a rate of rotation to a voltage amount. In the case of a modification of this type, it would even be possible to dispense with the controlled deceleration of the overall system and instead, only display an error message to avoid having to stop the drive system of the printing device.

Failure of the Power Supply

In this case, let it be assumed that the failure of the overall power supply has been detected by the main control device 6 using a known power sensing device which is not shown. This situation also requires the immediate controlled slowing down of the overall system to a standstill. In this case, the kinetic energy of the overall system is utilized such that the stopping of the cylinders can be achieved in two different ways.

In a first variant, it is assumed that the individual rectifiers of the drive control devices 5.1 to 5.N are connected to one another via a DC intermediate circuit. The motors 2.1 to 2.N are in this case slowed down to a standstill via a time function. The time function is defined in such a way that at each instant, DC voltage in the complete system is available as a result of the energy fed back during deceleration or braking of the motors. The DC voltage results from the mechanical energy of the motor axles continuing to rotate and generate DC voltage. This DC voltage can be detected using the signal transmitters 4.1 to 4.N and the detected amount of DC voltage in each of the motors is sent to the main control device 6 wherein the main control device 6 selects a time function according to a signal from one of the signal transmitters 4.1 to 4.N. It is preferred if the time function is defined to have as steep a deceleration decline as possible.

If the rectifiers of the individual drive control devices 5.1 to 5.N are not connected to one another via a DC intermediate circuit but instead are connected to respective ones of the position transmitters 3.1 to 3.N and the signal transmitters 4.1 to 4.N via individual intermediate circuits, then the drives (motors 2.1 to 2.N) dissipate the accumulating excess braking energy or voltage via braking reservoirs or resistors arranged in each of the individual intermediate circuits.

The braking resistors chop or reduce the excess voltage accumulating in each of the motors 2.1 to 2.N to a predetermined uniform level to ensure uniform deceleration and to maintain rotational synchronicity of each of the cylinders 1.1 to 1.N.

In the two previously described modes of operation when slowing down the overall system in the case of a failure of the power supply, a sufficiently dimensioned buffer in the form of one or more capacitors or accumulators is preferably provided in each intermediate circuit.

The previously described measures according to the preferred embodiments of the present invention for slowing down a multiple motor drive, including a plurality of drive units, of a printing machine ensure the single-fault safety for handling a failure of a single component of the system.

The simultaneous failure of a plurality of components of a multiple motor drive system can be viewed statistically as exceptionally small. However, in order to take precautions against mechanical disturbances causing a simultaneous failure of a plurality of components, additional mechanical devices may be provided between the individually driven axles, designated individually in the illustrated preferred embodiment as cylinders 1.1 to 1.N. Such mechanical devices may prevent rotation of the cylinders beyond a predetermined amount to prevent damage to the cylinders and the grippers.

Although the present invention has been described in relation to particular preferred embodiments thereof, many other variations and modifications and other uses will become apparent to those skilled in the art. It is preferred, therefore, that the present invention be limited not by the specific disclosure herein, but only by the appended claims.

What is claimed is:

1. A method for controlling a multiple motor drive of a printing machine including a plurality of drive units for driving printing cylinders individually or in groups, the method comprising the steps of:
    driving the printing cylinders via the drive units such that the printing cylinders are rotated in a synchronous manner to maintain a rotational alignment of the printing cylinders relative to each other;
    detecting a defective component in one of the drive units; and
    synchronously decelerating each of the drive units which are non-defective to a standstill in accordance with a time function which is determined by the drive unit having the defective component so as to maintain the rotational alignment of the printing cylinders relative to each other during the synchronous deceleration.

2. The method of claim 1, wherein each of the drive units includes a drive motor connected to a respective printing cylinder for driving the respective printing cylinder, a drive control device connected to a respective drive motor for controllably supplying voltage to the respective drive motor and a signal transmitter connected to the respective drive control device and respective drive motor for determining an amount of voltage supplied to the respective drive motor from the respective drive control device, the method further comprising the step of detecting a failure in one of the drive control devices and using a signal from the signal transmitter connected to the respective drive control device experiencing the failure as a control value for decelerating the drive units which are not experiencing the failure.

3. The method of claim 1, wherein each of the drive units includes a position transmitter connected to a respective printing cylinder for sensing a rotational position of the respective printing cylinder and a drive motor for driving the respective printing cylinder, the method further comprising the step of sensing a failure of one of the drive motors and using a signal from the position transmitter connected to the respective printing cylinder being driven by the respective drive motor experiencing the failure as a control value for decelerating the drive units which are not experiencing the failure.

4. The method of claim 1, wherein each of the drive units includes a position transmitter connected to a respective printing cylinder for sensing the rotational position of the respective printing cylinder, a drive motor connected to the respective printing cylinder for driving the respective printing cylinder, a drive control device connected to a respective drive motor for controllably supplying voltage to the respective drive motor and a signal transmitter connected to the respective drive motor for determining an amount of voltage supplied to the respective drive motor from the respective drive control device, the method further comprising the step of sensing a failure of one of the position transmitters and using a signal from the signal transmitter associated with the respective position transmitter experiencing the failure as a control value for decelerating the drive units which are not experiencing the failure.

5. The method of claim 1, wherein each of the drive units includes a drive motor connected to a respective printing cylinder for driving the respective printing cylinder, a position transmitter connected to a respective printing cylinder for sensing a rotational position of the respective printing cylinder, a drive control device for controllably supplying voltage to the respective drive motor and a signal transmitter connected to the respective drive motor for determining an amount of voltage supplied to the respective drive motor from the respective drive control device, the method further comprising the step of sensing a failure of one of the signal transmitters and using a signal from the position transmitter associated with the signal transmitter experiencing the failure as a control value for decelerating the drive units which are not experiencing the failure.

6. The method of claim 1, wherein in the event of failure of a main power supply of the printing machine, the drive units are decelerated to a standstill by a deceleration time function which is defined using DC voltage generated by the drive motors during braking of the drive motors.

7. A printing machine comprising:
    a plurality of printing cylinder drive units for driving a plurality of printing cylinders individually or in groups, each of the drive units including a drive motor and a drive control device for controllably supplying voltage to the respective drive motor; and
    a main control device for detecting a defective component in at least one of the drive units and for synchronously controlling deceleration of the drive units which are not defective in accordance with a time function defined by the drive unit having the defective component such that each of the drive units are synchronously decelerated to maintain a rotational alignment of the drive units relative to each other during the synchronous deceleration.

8. The printing machine according to claim 7, wherein each of the drive motors include a signal transmitter for supplying a signal indicative of an amount of voltage supplied to the respective drive motor from the respective drive control device, said signal transmitter of each drive motor being connected to said main control device for supplying signals thereto, said main control device using a signal received from one of said signal transmitters for defining the time function used for controlling deceleration of the drive units which are not defective.

9. The printing machine of claim 7, further comprising a plurality of position transmitters each being connected to one of the printing cylinders for detecting an angular position of the respective printing cylinder, said poisition transmitters being connected to the main control device for supplying position signals thereto, said main control device using a signal received from one of said position transmitters for defining the time function used for controlling deceleration of the drive units which are not defective.

10. The printing machine of claim 7, wherein the drive control devices are connected to the main control device for receiving signals from the main control device for controlling an amount of voltage supplied from the drive control device to the respective drive motor.

11. A system for controlling a plurality of printing cylinder drive units driving a plurality of printing cylinders of a printing machine individually or in groups, each of the drive units including a drive motor for driving a respective printing cylinder or group of printing cylinders, the system comprising:

a main control device connected to said drive units for detecting a defective component in at least one of the drive units and for synchronously controlling deceleration of the drive units which are not defective in accordance with a time function defined by the drive unit having the defective component such that each of the drive units are synchronously decelerated to maintain a rotational alignment of the drive units relative to each other during the synchronous deceleration.

12. The system according to claim 11, further comprising a plurality of drive control devices each being connected to one of the drive motors for controllably supplying power to the drive motors and connected to said main control device such that the main control device controls each of the drive control devices to decelerate the drive units upon occurrence of a failure in at least one of the drive units while maintaining an angular orientation of each of the printing cylinders relative to each other.

13. The system according to claim 11, further comprising a plurality of drive control devices each connected to one of the drive motors for controllably supplying voltage to the respective drive motor and a plurality of signal transmitters each connected to one of the drive control devices for determining an amount of voltage supplied to the respective drive motor from the respective drive control device.

14. The system according to claim 13, wherein each of the drive control devices and the signal transmitters are connected to the main control device such that the main control device receives signals from the signal transmitters and controls each of the drive control devices according to a time function based upon one of the signals received from the signal transmitters to decelerate the drive units upon occurrence of a failure in at least one of the drive units while maintaining an angular orientation of each of the printing cylinders relative to each other.

15. The system according to claim 11, further comprising a plurality of drive control devices each connected to one of the drive motors for controllably supplying voltage to the respective drive motor and a plurality of position transmitters each connected to one of the printing cylinders for determining a rotational position of the respective one of the printing cylinders.

16. The system according to claim 15, wherein each of the drive control devices and the position transmitters are connected to the main control device such that the main control device receives signals from the position transmitters and controls each of the drive control devices according to a time function based upon one of the signals received from the position transmitters to decelerate the drive units upon occurrence of a failure in at least one of the drive units while maintaining an angular orientation of each of the printing cylinders relative to each other.

17. The system according to claim 11, further comprising a plurality of drive control devices each connected to the main control device and one of the drive motors for controllably supplying voltage to the respective drive motor, wherein in the event of failure of a main power supply of the printing machine, the main control device decelerates each of the drive units and printing cylinders to a standstill by a deceleration time function which is defined using DC voltage generated by the drive motors during braking of the drive motors.

* * * * *